(12) United States Patent
May

(10) Patent No.: US 8,058,865 B2
(45) Date of Patent: *Nov. 15, 2011

(54) SENSOR DEVICE, SENSOR ARRANGEMENT, AND METHOD OF MEASURING A PROPERTY OF AN OBJECT

(75) Inventor: Lutz May, Berg (DE)

(73) Assignee: NCTEngineering GmbH, Unterhaching (DE)

( * ) Notice: Subject to any disclaimer, the term of this patent is extended or adjusted under 35 U.S.C. 154(b) by 679 days.

This patent is subject to a terminal disclaimer.

(21) Appl. No.: 11/996,867

(22) PCT Filed: Aug. 29, 2006

(86) PCT No.: PCT/EP2006/008453
§ 371 (c)(1),
(2), (4) Date: Jul. 29, 2008

(87) PCT Pub. No.: WO2007/025720
PCT Pub. Date: Mar. 8, 2007

(65) Prior Publication Data
US 2008/0315870 A1 Dec. 25, 2008

Related U.S. Application Data

(60) Provisional application No. 60/712,926, filed on Aug. 30, 2005.

(30) Foreign Application Priority Data

Aug. 30, 2005 (EP) .................................. 05018794

(51) Int. Cl.
*G01B 7/14* (2006.01)
*G01B 7/30* (2006.01)
*H01F 5/00* (2006.01)

(52) U.S. Cl. .............................. 324/207.16; 324/207.25
(58) Field of Classification Search .................. 324/209, 324/207.25, 207.15, 207.16; 73/862.333, 73/862.334, 862.335, 862.336
See application file for complete search history.

(56) References Cited

U.S. PATENT DOCUMENTS

| 6,810,754 | B2 | 11/2004 | May | |
|---|---|---|---|---|
| 2004/0035221 | A1* | 2/2004 | May | 73/862.331 |
| 2004/0040391 | A1* | 3/2004 | May | 73/862.331 |
| 2009/0102463 | A1* | 4/2009 | May | 324/207.16 |

FOREIGN PATENT DOCUMENTS

| CH | 340 903 | 8/1955 |
|---|---|---|
| EP | 0 490 710 | 6/1992 |
| WO | 88/02842 | 4/1988 |
| WO | 02/059555 | 8/2002 |
| WO | 02/063262 | 8/2002 |
| WO | 2005/064301 | 7/2005 |

* cited by examiner

*Primary Examiner* — Kenneth J Whittington
(74) *Attorney, Agent, or Firm* — Fay Kaplun & Marcin, LLP

(57) ABSTRACT

A sensor device measures a property of an object. The sensor device comprises a magnetic field generator adapted to generate a magnetic field in at least a part of the object, and at least one magnetic field detector adapted to detect at least one detection signal in response to the magnetic field generated in at least a part of the object. The at least one detection signal is indicative of the property of the object. A direct current or a direct voltage is applicable to the magnetic field generator to generate the magnetic field in at least a part of the object.

29 Claims, 10 Drawing Sheets

SENSOR DEVICE, SENSOR ARRANGEMENT, AND METHOD OF MEASURING A PROPERTY OF AN OBJECT

This application claims the benefit of the filing date of European Patent Application No. 05 018 794.7 filed Aug. 30, 2005, and of U.S. Provisional Patent Application No. 60/712, 926 filed Aug. 30, 2005, the disclosure of which is hereby incorporated herein by reference.

FIELD OF INVENTION

The present invention relates to a sensor device and a method for measuring a property of an object.

BACKGROUND INFORMATION

Magnetic transducer technology finds application in the measurement of torque and position. It has been especially developed for the non-contacting measurement of torque in a shaft or any other part being subject to torque or linear motion. A rotating or reciprocating element can be provided with a magnetized region, i.e. a magnetic encoded region, and when the shaft is rotated or reciprocated, such a magnetic encoded region generates a characteristic signal in a magnetic field detector (like a magnetic coil) enabling to determine torque or position of the shaft. Such kind of sensors are disclosed, for instance, in WO 02/063262.

WO 05/064301 discloses another torque sensor based on a magnetic sensor principle and is based on the application of current pulses directly to a shaft, the pulses being defined by a steep raising edge and a slow falling edge.

U.S. Pat. No. 6,810,754 discloses a transducer for measuring displacement comprising a transducer assembly in which there is a coil wound about an axis and energizable to generate a magnetic field, and first and second magnetic field sensor devices, that are axially spaced with the coil therebetween, each device being in proximity to the coil to respond to a magnetic field component generated by energization of the coil. A ferromagnetic member is disposed to interact with the field generated by the coil, the ferromagnetic member and the transducer assembly being mounted for relative displacement in the direction of said axis, such that the balance of the respective field components sensed by the first and second sensor devices is a function of the axial position of the ferromagnetic member relative to the transducer assembly.

SUMMARY OF INVENTION

According to an exemplary embodiment of the invention, a sensor device for measuring at least one property (i.e. one property or a plurality of properties) of a (for instance movable or static) object (which may be made of a magnetizable material) is provided, the sensor device comprising a magnetic field generator adapted to generate a magnetic field in at least a part of the object, and at least one magnetic field detector adapted to detect at least one detection signal in response to the magnetic field generated in at least a part of the object, wherein the at least one detection signal is indicative of the property of the object.

According to another exemplary embodiment of the invention, a sensor arrangement for measuring a property of an object is provided, the sensor arrangement comprising a sensor device having the above-mentioned features, and the object (which may optionally be coupled to the magnetic field generator and/or which may optionally be coupled to the at least one magnetic field detector).

According to still another exemplary embodiment of the invention, a method of measuring a property of an object is provided, the method comprising generating a magnetic field in at least a part of the object by means of applying a direct current or a direct voltage to a magnetic field generator, and detecting at least one detection signal in response to the magnetic field generated in at least a part of the object, wherein the at least one detection signal is indicative of the property of the object.

According to an exemplary embodiment of the invention, a sensor device is provided which includes a magnetic field generator and one or more magnetic field detectors. The sensor device may engage a static or movable object under examination to obtain a small distance between the object and the magnetic field generator for an efficient magnetic field transfer, so that a physical (for instance motion-related) parameter of the object can be measured with high accuracy and efficiency. Such a parameter may be, for instance, an angular position of the rotating object, an angular velocity of the rotating object, an angular acceleration of the rotating object, a position of a reciprocating object, a velocity of a moving object, an acceleration of a moving object, a torque applied to an object, a force applied to an object, a shear force applied to the object, etc. It is possible to measure one of these or other parameters or a plurality of these or other parameters subsequently or simultaneously.

The sensor solution can be applied to objects that may be in a static position or that may be in a dynamic state (moving objects, whereby moving may mean: rotation, bending, linear movement, etc.). The sensing technology can be used to measure at least one of the following mechanical forces: torque, bending, sheering, axial load, etc.

In contrast to known approaches, embodiments of the invention do not rely on applying current pulses (which is believed to result in a sensor that may not work properly and error-free), but implement applying a direct current or voltage to the magnetic field generator.

The technology according to an exemplary embodiment of the invention can be applied to static and to moving devices. The technology does not require necessarily that the object can be magnetizable (that is to say does not require necessarily that a magnetic field is storable permanently in the object). However, it may be advantageous that the material used for the object has magnetic properties in such way that a magnet will stick to it. Of course, magnetizable objects will work properly.

Further, it may be advantageous that the material of the object is sufficiently hard or is hardened so that the signal hysteresis specification is accurate. Surface hardening and case hardening can be applied, depending on the used material.

The sensor device may be (fixedly or detachably) mounted on the object to be investigated. The object may be made of a material which is magnetizable, i.e. which may have magnetic properties at least in the presence of an external magnetic field. Such a material may be, for instance, industrial steel, or ferromagnetic iron, or any other material which has paramagnetic or ferromagnetic properties (e.g. a 3 d magnet or a 4 f magnet).

A direct current or a direct voltage (in contrast to an alternating current or an alternating voltage) may be applied to the magnetic field generator which can be a magnetic field generator coil (an electromagnet or the like). Consequently, a magnetic field may be generated on the surface and/or in the interior of the object which may be located surrounded by the windings of the magnetic field generator coil. Thus, applying such a direct current (DC) or direct voltage may generate an essentially homogeneous and longitudinally oriented magnetic field along an extension of the object which may consequently be magnetized. For instance, the object may be the shaft of a motor.

The magnetic field generating current or voltage may be large enough to generate a sufficiently strong magnetic field within the object to cause a measurable magnetization, but should be small enough that the magnetic field distribution within the shaft is sensitively modifiable by a motion or other force applied to the object. In other words, when a magnetic field of appropriate amplitude is generated in the object by means of the magnetic field generator, a torque or other force which is simultaneously applied to the movable object may characteristically modify the magnetic field distribution within the movable object. Thus, a magnetic signal (for instance an induction voltage or the like which may be detected by means of the magnetic field detector, which may be realized as coils) may be indicative of the applied torque or force. Then, such a signal can be taken as a basis for determining amplitude and/or direction of the applied torque or force qualitatively or quantitatively. It is believed that, by means of the external influence exerted on the object, direction and/or amplitude of the magnetization vector inside of the magnetizable object is characteristically manipulated. This effect may serve as a basis for a detection principle according to an exemplary embodiment of the invention.

After having measured one or more detection signals by means of the one or more magnetic field detectors, the activating direct (or constant over a period of time) electrical signal may be switched off, so that it may happen that essentially no magnetization remains in the movable object. In other words, the magnetization of the movable object by means of the magnetic field generated by the DC may be reversible.

The detecting signals may be evaluated or analyzed in a determination unit (for instance a computing instance like a central processing unit, a microprocessor or a computer) to derive the desired result, for instance the value of the torque which is presently applied to the movable object. After such a measurement, the sensor device may be taken off from the movable object and may be transported to another place. Thus, a portable system for measuring any kind of force or torque may be provided which may be easy to manufacture, flexible, fast and cheap in use.

A constant electrical signal applied to the generator coil may generate, temporarily, a magnetic field in the movable object (for instance a shaft) with a sufficiently small value (for instance less or equal 30 Gauss at a surface portion of the movable object). The magnetic field introduced in the movable object should be below a threshold of permanent magnetization. Furthermore, the magnetic field should be sufficiently small to ensure that the magnetic field vectors "follow" external (particularly motion-induced) influences to the shaft.

A proper orientation of the detector(s) provided, it is believed that the application of the constant magnetic field itself does not generate a signal in the detector coils in the absence of a force or torque applied to the movable object. Such a "null" effect in the absence of a magnetic field generated by the generator coil and a simultaneous external impact on the object may be achieved by a proper orientation the detector coils, since the orientation of the coil axis with respect to the magnetization vector may have a strong influence on the sensitivity of a detector coil for detecting such a magnetization. The orientation may therefore be chosen in such a manner that the detector coils only detect a signal when a "tilting" or "twisting" of the magnetic field vector occurs as a consequence of the applied force or torque. Such a "tilting" or "twisting" effect seems to be obtainable by applying, to the magnetic field generator, a direct current or a direct voltage, that is to say an electrical signal which does not vary in time.

According to an exemplary embodiment of the invention, the shaft itself does not have to be permanently magnetized.

Thus, according to an exemplary embodiment of the invention, a DC signal is supplied to energize the magnetic field generator. Appropriate current values are within a range and should be small enough to allow the magnetization vectors to be modified by means of a torque or force, and should also be large enough to allow to obtain a detectable signal.

According to an exemplary embodiment of the invention, a portable sensor device may be provided which may simply be slid or mounted on a movable object which shall be subject of a measurement. The detection coils may be mounted directly on or may be integrated in a housing of the generator coil. Thus, a full signal bandwidth may be obtained with a measurement according to an exemplary embodiment of the invention, since the detection signal can be permanently measured during applying the DC signal. Thus, the method may be appropriate for a real time measurement of force or torque, particular in a scenario when the force and/or torque may vary in time. For instance, it is possible to measure the modifications of the torque of a shaft of a car during an ignition.

It is also possible to calibrate the sensor device, for instance by applying a known torque to the sensor device and by measuring the corresponding detection signal. By taking such a measure, the reliability and reproducibility of the results may be improved.

The generator coil may have an optimized number of windings, for instance 300.

In order to reduce a possible offset contribution of the detection signal(s), it may be possible to perform (or repeat) the measurement with two different current or voltage values. Therefore, two measurements or measurement parts may be carried out subsequently with two different constant current or voltage values.

The duration of such intervals may be selected in dependence of the thickness of the shaft and of the direct current value. For instance, for a shaft having a diameter of between 15 mm and 18 mm, an electrical current of 100 mA may be applied for 20 ms. For a 30 mm diameter shaft, the application of 100 mA may be appropriate for a time interval of 100 ms.

Implementing two or more direct current phases, it may be possible to remove a measurement offset in a mathematical manner.

Next, exemplary embodiments of the sensor device will be described. However, these embodiments also apply for the sensor arrangement and for the method of measuring a property of a object.

The direct current or the direct voltage may be adapted in such a manner that, after switching off the direct current or the direct voltage, the object is essentially free of a remaining magnetization. This may have the advantage that, after the measurement is finished, the fixed or movable object is no longer influenced by the measurement, that is to say the physical properties of the movable object are identical after the measurement as compared to the physical properties of the movable object before the measurement.

The direct current or the direct voltage may be applicable to the magnetic field generator to generate the magnetic field in at least a part of the object with a strength of less or equal 30 Gauss (measured close to a surface of the object). Generating such a sufficiently small magnetic field may ensure that the magnetic sensor remains highly sensitive to any motion, torque or force applied to the object, so that even a small torque or force may modify the response of the temporarily magnetized object in a characteristic manner.

For instance, the direct current applicable to the magnetic field generator may have a strength of less or equal 500 mA, particularly of less or equal 300 mA, more particularly of less or equal 200 mA.

The direct current or the direct voltage may have a constant value over at least an interval of time. Such a time-independent application of a constant electrical signal for activating the generator coil may simplify the electrical circuitry and may allow to measure force or torque in a time dependent manner.

The sensor device may further comprise a determination unit adapted to determine at least one parameter indicative of the one or more properties of the object (for instance of an external influence exerted on the object) based on the at least one detection signal. Such a determination unit may be a microprocessor or a computer.

The magnetic field generator may be a magnetic field generator coil. For such a magnetic field generator coil, the number of windings and/or the length and/or the cross-sectional area may be chosen (e.g. optimized) to achieve accordance with required or predefined specifications. The coil axis may be configured or designed in such a manner that the object may be located inside thereof. In other words, the windings of the magnetic field generator coil may surround the object.

For this purpose, the magnetic field generator may have a reception for receiving the object. This may allow to operate the sensor device as a portable sensor device which may be reversibly or detachably connectable to a object under examination.

The reception may be a central opening of the magnetic field generator. Based in this geometry, a symmetrical configuration with a large signal-to-noise ratio may be obtained.

The direct current or the direct voltage (serving as a magnetic field generating signal) may have a first value applied for a first time interval and may have a second value applied for a second time interval. By dividing the measurement into two separate intervals each being characterized by a constant current or constant voltage signal, it may be possible to compensate for offset effects to thereby reduce artefacts from the measurement. This may improve the accuracy of the sensor device. Constant offset contributions included in the measurement signals which offset contributions are independent of the property (e.g. torque) to be measured, may thus be removed from the measurement by mathematically evaluating (e.g. subtracting) the detection signals related to the two measurement intervals. By taking this measures, any "property-independent" contributions (e.g. originating from the earth magnetic field or magnetic stray fields) may be suppressed or eliminated.

The first value and the second value may have different amplitudes. For instance, the first value may be +20 mA, and the second value may be +100 mA.

Additionally or alternatively, the first value and the second value may have opposite signs. For instance, the first value may be +100 mA and the second value may be −100 mA. Or, the first value may be +50 mA and the second value may be −10 mA.

At least one of the first time interval and the second time interval may be in the range between 1 ms and 500 ms, particularly between 20 ms and 100 ms. Thus, the sensor device may allow for a fast and/or time dependent measurement of the parameter to be detected.

The at least one magnetic field detector may be arranged on (e.g. attached onto) the magnetic field generator. By mounting the magnetic field detector(s) on the magnetic field generator, a compact and cheap portable detector unit may be realized. Beyond this, particularly with a corresponding coil axis orientation, the position of the magnetic field generator may be advantageous for the magnetic field detectors, since the detection signal may be relatively strong at this position.

The at least one magnetic field detector may also be integrated in the magnetic field generator. By taking this measure, the size of the sensor device may be kept small. Positioning the detectors in close vicinity of the generator may allow for an accurate measurement, since the detection signal may have a high value here.

The sensor device may comprise two magnetic field detectors which are arranged symmetrically (with respect to and/or on the magnetic field generator. In such a configuration, the signals of the two magnetic field detectors may be analyzed or evaluated simultaneously, and disturbing effects and artefacts (like the earth magnetic field or magnetic stray fields) may be eliminated by means of a mathematical analysis (for instance by calculating a difference signal, a weighted signal or an averaged signal).

The sensor device may comprise a plurality of magnetic field detectors. For example, it is possible to use two, three, four, five, six or even more magnetic field detectors to improve the accuracy. For instance, the plurality of magnetic field detectors may each detect a signal, so as to carry out an at least partially redundant measurement.

Any of the magnetic field detectors may comprise a coil having a coil axis oriented essentially parallel to an extension of the object. Alternatively, any of the magnetic field detectors may be realized as a coil having a coil axis oriented essentially perpendicular to an extension of the object. A coil being oriented with any other angle between coil axis and extension of the object is possible as well. As an alternative to a coil in which a moving magnetized region may generate a motion-dependent electrical detection signal, a Hall-effect probe may be used as a magnetic field detector making use of a Hall-effect. Alternatively, a Giant Magnetic Resonance magnetic field sensor or a Magnetic Resonance magnetic field sensor may be used as magnetic field detector. However, any other magnetic field detector may be used to detect (qualitatively or quantitatively) the presence or absence and/or the strength of a magnetic field within the object which magnetic field may be modified by any external influence exerted on the moving object.

The sensor device may be capable to measure an angular position of the object when rotating, a position of the object when reciprocating, a torque applied to the object, a force applied to the object, a shear force applied to the object, a velocity of the object, an acceleration of the object, and a power of the object. However, these examples are not the only possible parameters to be sensed according to exemplary embodiments of the invention. Furthermore, it is possible to measure a plurality of the above or other parameters simultaneously or subsequently. Measured parameters can also be further processed, for instance to derive other parameters. For example, the product of an estimated velocity and of an estimated torque may be indicative of the power applied to a rotating object.

The property of the object to be measured may be an external influence exerted on the object. Such an external influence may be any kind of force, particularly a rotational force and/or a linear force. Such a force may cause the object to be brought in motion, for instance a linear or angular acceleration.

Furthermore, the sensor device may be adapted as a portable sensor device. For example, the sensor device may be transported to a location where a property of a object shall be measured. The sensor device may be installed at the site where the object is located, for instance may be coupled or assembled with the object under examination. Then, the measurement may be carried out. After that, the sensor device may be disassembled from the object under examination and may be brought to another location for another measurement. Therefore, the object may be realized as a handheld device which may be transported by an engineer to any desired location so that a flexible operability may be obtained.

The sensor device may comprise a plurality of magnetic field generators. Thus, the accuracy of the measurement may be refined. Particularly, the plurality of magnetic field generators may be arranged along an extension of the object. When the magnetic field generators are realized as magnetic field generator coils, the coil axes of the multiple magnetic field generator coils may be oriented parallel with respect to one another.

The at least one magnetic field detector may be provided movable or shiftable along an extension of the object. By taking this measure, it is possible to sample or scan, with a single or with multiple magnetic field detectors, the detection signal along the extension of the object and/or the magnetic field generator so as to improve the measurement.

The magnetic field generator may be adapted to generate the magnetic field temporarily or permanently in at least a part of the object. In other words, after switching off the activation signal for generating a magnetic field in the magnetic field generator, there may or may not remain a magnetization in the object, in dependence of the material of the object and/or of the parameters specifying the activation signal.

The object may be a movable object (for instance for measuring torque, velocity, acceleration) or may be a static object (for instance for measuring a weight or a shear force). A static object may be an object which is not moved or which is not movable, i.e. which is spatially fixed.

The object may be made of a magnetic (e.g. a paramagnetic or a ferromagnetic) material or may be made of a magnetizable material (i.e. a material which has a magnetization in the presence of an external magnetic field).

In the following, exemplary embodiments of the sensor arrangement will be described. However, these embodiments also apply for the sensor device and for the method of measuring a property of an object.

The object may be at least one of the group consisting of a round shaft, a tube, a disk, a ring, and a none-round object, for instance having a rectangular cross section. However, these geometrical configurations are only exemplary.

The object may be one of the group consisting of an engine shaft, a reciprocable work cylinder, and a push-pull-rod. In all of these applications, the magnetic field induced magnetization of such a position, torque, shear force and/or angular sensor may be advantageous, since it may allow to manufacture a highly accurate and reliable force, position, torque, shear force and/or angular position sensor with low costs. Particularly, mining and drilling equipment may be provided with the systems of the invention, and may be used for monitoring the drilling angle, drilling direction and/or drilling forces. A further exemplary application of the invention is the recognition and the analysis of engine torque and/or engine knocking. Furthermore, in washing machine, a load of clothes can be estimated by means of a sensor device according to an exemplary embodiment of the invention.

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

DETAILED DESCRIPTION

Figure 1:
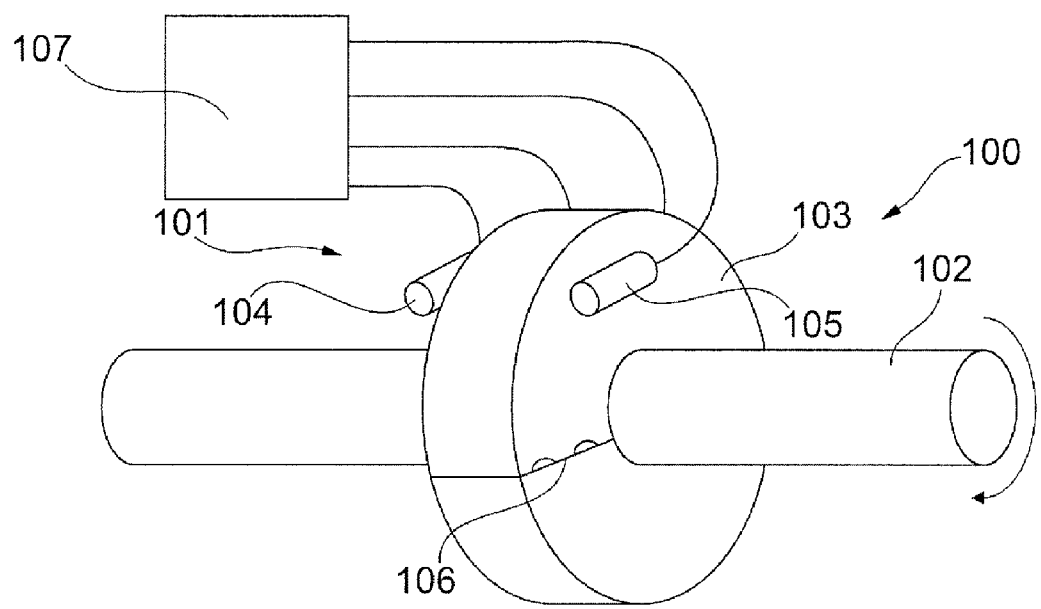
FIG. 1 illustrates a sensor arrangement according to an exemplary embodiment of the invention.

The illustration in the drawing is schematically. In different drawings, similar or identical elements are provided with the same reference signs.

In the following, referring to FIG. 1, a torque sensor arrangement 100 for measuring torque exerted on an engine shaft 102 made of industrial steel (being magnetizable) according to an exemplary embodiment of the invention will be described.

The torque sensor arrangement 100 comprises a torque sensor device 101 and the engine shaft 102. The engine shaft 102 is surrounded by a generator coil 103 and located in vicinity of a first detector coil 104 and a second detector coil 105 of the torque sensor device 101.

The torque sensor device 101 is adapted for measuring torque applied to the engine shaft 102 which therefore rotates. The torque sensor device 101 comprises the generator coil 103 which is adapted to generate a magnetic field in a part of the engine shaft 102 which is surrounded by the generator coil 103. Furthermore, the two detector coils 104, 105 are adapted to detect two detection signals in response to a magnetic field generated in the rotating shaft 102 by the generator coil 103. The detection signals are indicative of the torque which is presently exerted on the engine shaft 102. Particularly, a direct current (DC) is applied to the generator coil 103 to generate the magnetic field in a central portion of the rotating shaft 102.

According to the described embodiment, a direct current of 100 mA is applied for a time of 20 ms to the rotating shaft 102. This strength and this time may be appropriate so that a magnetization generated during the measurement experiment will not remain permanently in the engine shaft 102 after having switched off the DC activation signal. Thus, after the experiment, the shaft 102 is again free of a remaining magnetization, that is to say is essentially demagnetized.

The activation current applied to the generator coil 103 is constant over time. In contrast to a pulsed measurement, this may allow for a quasi-continuous detection of the torque applied to the engine shaft 102 and may simplify the constitution of a connected control electronics 107.

The control electronics 107 may be an integrated circuit (which may be manufactured in silicon technology, for instance) or may be a conventionally wired circuit (for instance a printed circuit board, PCB). The control electronics 107 provides the generator coil 103 with control signals and serves as an energy supply for generating the direct current signal applied to the generator coil 103 for magnetizing the rotating shaft 102. Furthermore, the control electronics 107 is also coupled to the detector coils 104, 105 to receive and evaluate the detection signals captured by the detector coils 104, 105 to thereby determine the torque applied to the rotating shaft 102. This detection result may be displayed by means of the control electronics 107 or may be transmitted to another entity, for instance a computer for further processing the result and/or for providing a (graphical) user interface.

As can further be taken from FIG. 1, a hinge joint 106 may be provided to detachably install the sensor device 101 on the movable object 102. In other words, when the hinge joint 106 is opened, the sensor device 101 may be opened so as to allow to remove the engine shaft 102. This allows to use the torque sensor device 101 as a portable sensor device which may then be transported to another location for measuring torque there.

The central bore of the generator coil 103 serves as a reception for the engine shaft 102 and may surround the sensor shaft 102. When the engine shaft 102 is surrounded by the sensor device 101, the engine shaft 102 may still be capable to freely rotate with the sensor device 102 remaining in a non-rotating fixed position. Alternatively, the engine shaft 102 may by firmly engaged by the sensor device 101, so that the engine shaft 102 may rotate with the sensor device 101 following the rotation of the engine shaft 102.

As can be taken from FIG. 1, the two detector coils 104, 105 are arranged symmetrically on the generator coil 103. Thus, a compact and accurate sensor may be obtained.

In the following, referring to FIG. 2, a sensor device 200 according to an exemplary embodiment of the invention will be described.

Figure 2:
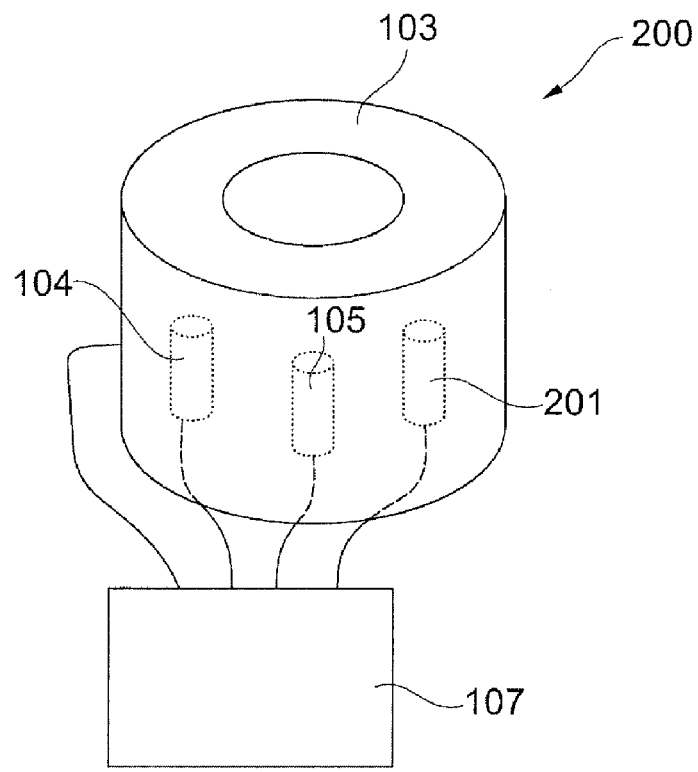
FIG. 2 illustrates a sensor device according to an exemplary embodiment of the invention.

As can be seen in FIG. 2, in addition to a plurality of the elements shown in FIG. 1, a third detector coil 201 is provided which is also connected to the control electronics 107. Furthermore, the detector coils 104, 105, 201 are integrated within a housing of the generator coil 103. This may allow for a very compact geometry.

In the following, referring to FIG. 3 to FIG. 6, it will be described in a schematic and demonstrative manner, how it is believed that the sensor principle according to an embodiment of the invention might be explained.

Figure 3:
FIG. 3 to FIG. 6 illustrate schematically the process of magnetizing and demagnetizing of a movable object in different operation states.

FIG. 3 shows the shaft 102 in a non-rotating state and in an operation state in which no magnetic field is applied to the magnetizable shaft 102.

Figure 4:
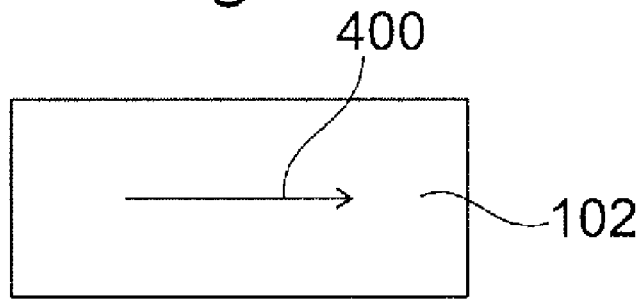

As shown in FIG. 4, after having applied a magnetic field to the magnetizable shaft 102 which is still in a non-rotating state, a magnetization indicated by a magnetization vector 400 is generated in the shaft 102. Such a longitudinal magnetization 400 can be achieved by the coil configuration of FIG. 1.

Figure 5:
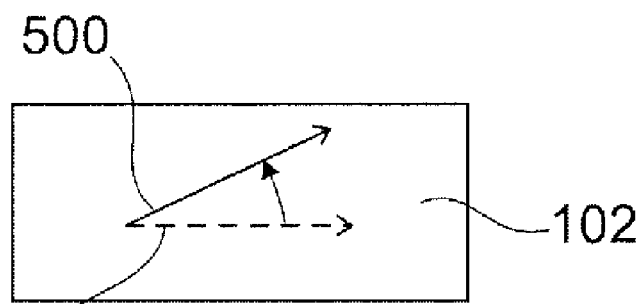

As shown in FIG. 5, when torque is applied to the shaft 102, this torque also influences the magnetization properties of the shaft 102. Therefore, a torque modified magnetization vector 500 is obtained which varies, in direction, with respect to the magnetization vector 400. In other words, the magnetization vector is tilted under the influence of the torque exerted on the shaft 102. Consequently, the detector coils 104, 105 may measure a modified detection signal.

Figure 6:
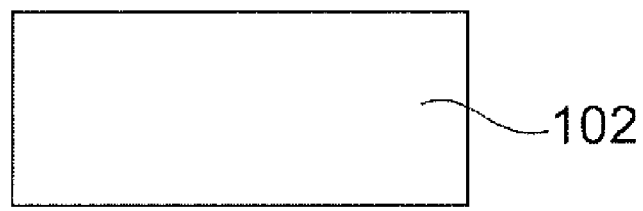

As shown in FIG. 6, after removing the externally applied magnetic field, that is to say by switching off the direct current applicable to the generator coil 103, the reversibly generated magnetization may be removed.

In the following, referring to FIG. 7, a sequence of signals which may be applied during experiments using a torque sensor arrangement 100 will be explained.

Figure 7:
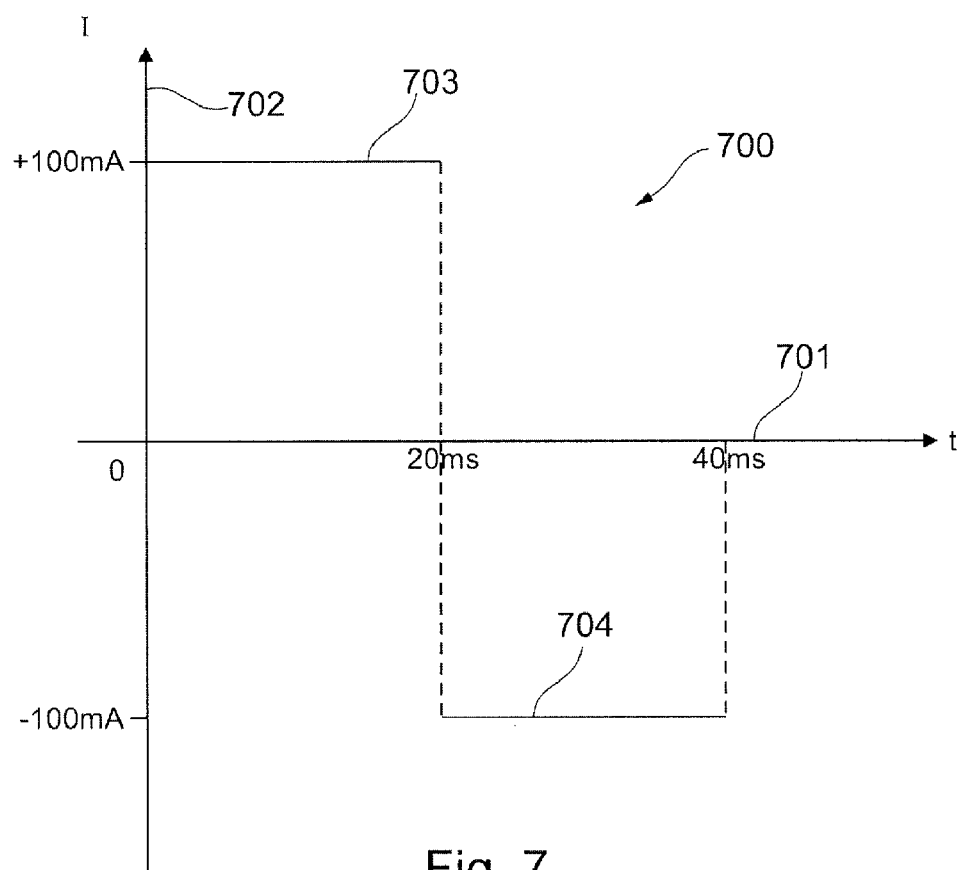
FIG. 7 and FIG. 8 show graphs each illustrating a sequence of direct current signals for operating a sensor device according to an exemplary embodiment of the invention.

FIG. 7 shows a diagram 700 having an abscissa 701, along which a time is plotted. Along an ordinate 702 of the diagram 700, a value of a current is plotted which may be applied to activate the generator coil 103.

As can be taken from a first signal 703 shown in FIG. 7, a first direct current signal having an amplitude of +100 mA is applied to the generator coil 103 for a time of 20 ms. Subsequently, a second direct current signal 704 having a current value of −100 mA may then be applied to the generator coil 103 for further 20 ms.

With the two different measurements related to the signals 703, 704, an offset of a measurement can be removed mathematically.

Figure 8:
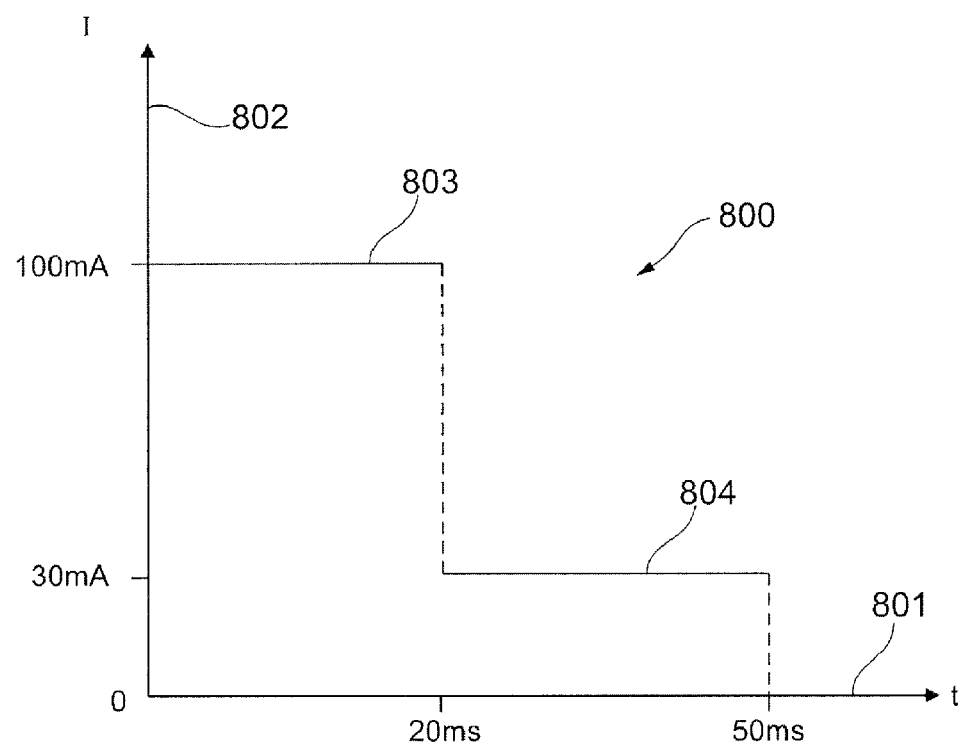

In a similar manner, FIG. 8 shows a diagram 800 having an abscissa 801 along which a time is plotted, and having an ordinate 802 along which a current is plotted. A first direct current signal 803 and a second direct current signal 804 are further plotted in FIG. 8.

The first direct current signal 803 corresponds to a current of +100 mA applied for 20 ms. The second direct current signal 804 corresponds to a current value of +30 mA applied for further 30 ms.

Again, when the two measurements 803, 804 are analyzed or evaluated in a combined manner, an offset may be removed or reduced by a corresponding calculation algorithm.

Figure 9:
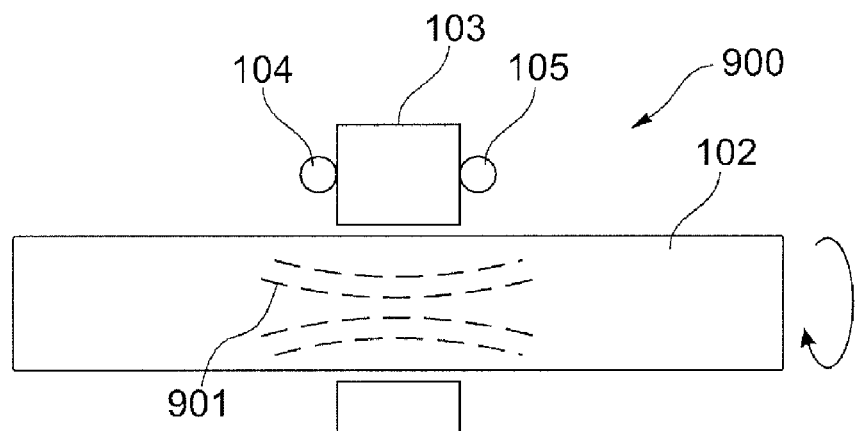
FIG. 9 illustrates a sensor arrangement according to an exemplary embodiment of the invention.

In the following, referring to FIG. 9, a sensor arrangement 900 will be explained The sensor arrangement 900 can be seen as a cross sectional view of FIG. 1, wherein a longitudinal magnetization 901 of the shaft 102 is shown, generated by a magnetic field of the generator coil 103.

In the following, referring to FIG. 10 to FIG. 12, some simplified schemes are shown for explaining exemplary relative orientations of the shaft 102 with respect to the corresponding detection coil 104.

Figure 10:
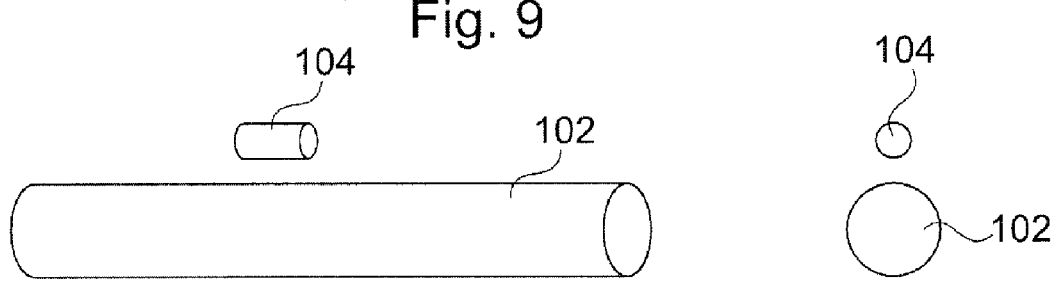
FIG. 10 to FIG. 12 illustrate different coil orientations of a sensor device according to an exemplary embodiment of the invention.

The arrangement shown in FIG. 10 may be denoted as an "axial" alignment of the detector coil 104 with respect to the shaft 102. In such a configuration, it may be advantageous to locate the detector coil 104 close to the position of the generator coil 103 (for example to attach the detector coil 104 at the generator coil 103, not shown in FIG. 10).

Figure 11:
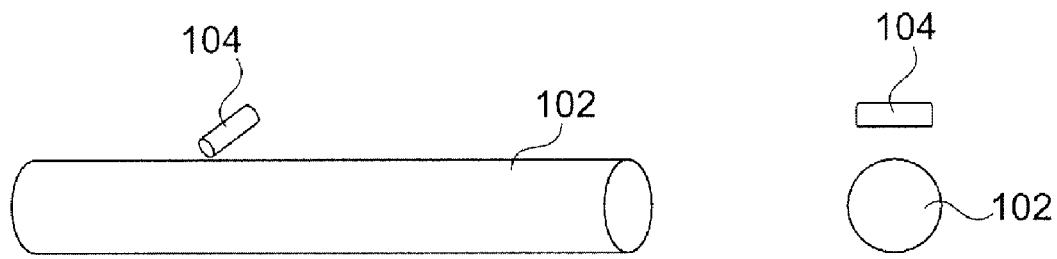

In a "tangential" geometry as shown in FIG. 11 in which the detector coil 104 is oriented perpendicular to the extension of the shaft 102, it might be advantageous to locate the detector coil 104 laterally spaced with respect to the generator coil 103 (not shown in FIG. 11).

Figure 12:
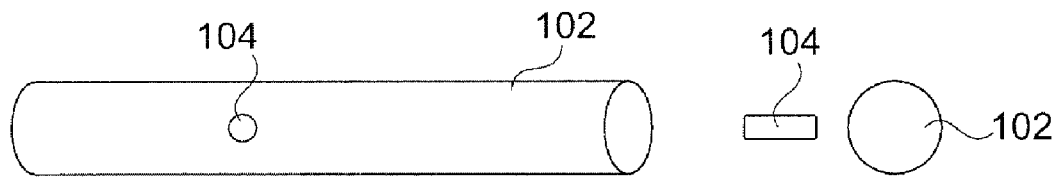

In a "radial" geometry as shown in FIG. 12 in which the detector coil 104 is oriented perpendicular to the extension of the shaft 102 and perpendicular to the orientation of the detector coil 104 of FIG. 11, it may be possible to locate the detector coil 104 close to the position of the generator coil 103 (not shown in FIG. 12) or laterally spaced with respect the generator coil 103.

In the following, referring to FIG. 13, a sensor arrangement 1300 according to an exemplary embodiment of the invention will be described.

Figure 13:
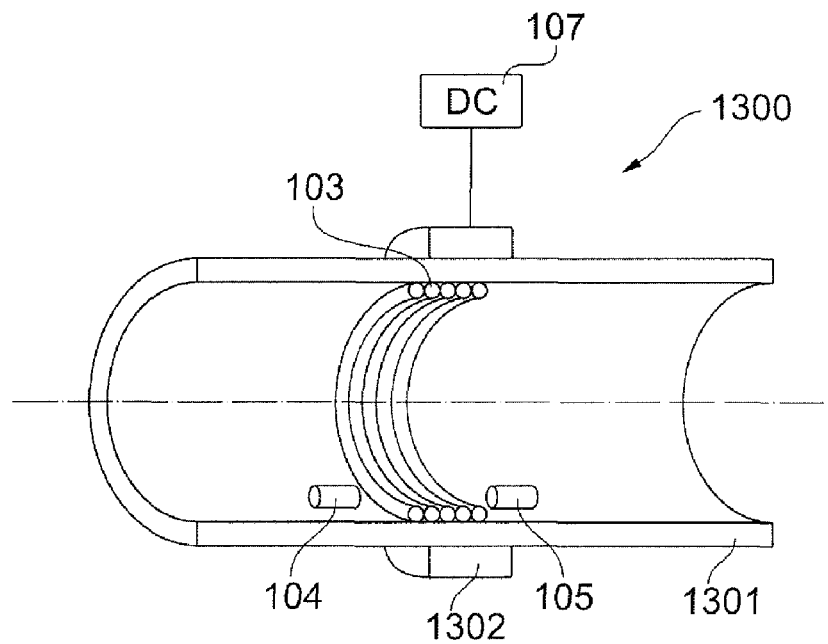
FIG. 13 illustrates a sensor arrangement according to an exemplary embodiment of the invention.

FIG. 13 shows a longitudinal section through a tube 1301 (which may be closed in a circumferential direction) which may or may not be made of steel or other magnetizable or permanent magnetic (e.g. ferromagnetic) material. The tube 1301 can, for example, house a gear shaft 102 (not shown) extending along the axis of the tube 1301. A magnetic transducer assembly 104, 105 is mounted within the tube 1301. To mechanically support the arrangement 1300, a member 1302 may be provided optionally.

The arrangement 1300 comprises the generator coil 103, such as a helical coil, mounted at or closely adjacent the inner wall surface of the tube 1301, the generator coil 103 being wound about the axis of the tube 1301. Closely adjacent each end of the generator coil 103 is mounted a respective magnetic sensor device 104 and 105. Suitable sensor devices include the magnetoresistive Hall-effect or saturating core type. A signal conditioning and processing circuit 107 may be used (e.g. control electronics with the capability of applying a direct current to the generator coil 103).

The sensor arrangement 1300 may be mounted on a movable object, e.g. a shaft 102. The shaft 102 may be magnetized by activating the generator coil 103. When the shaft 102 is rotated, the magnetization properties thereof may be modified in response to the rotation, so that a magnetic detection signal measurable by the detection coils 104, 105 may also be modified. Therefore, by means of the computing resources 107, the torque which is presently applied to the shaft 102 may be detected based on the signals detected by the detection coils 104, 105.

In the following, referring to FIG. 14, a torque sensor arrangement 1400 for measuring torque applied to an engine shaft 102 according to an exemplary embodiment of the invention will be described.

The torque sensor arrangement 1400 may also be denoted as a DC current driven total force sensor.

The mechanical force sensing principle of the torque sensor arrangement 1400 may allow producing a complete sensing module without the need of any magnetic pre-processing of the mechanical power transmitting shaft 102. This has benefits as it will be much simpler producing, calibrating, and shipping the sensing module to a user. In technologies where the mechanical power transmitting shaft 102 has to be magnetically pre-processed, the shaft 102 is part of the sensor system shipment which could be more costly.

The mechanical force sensing technology according to an exemplary embodiment of the invention may allow for detecting and measuring most of the mechanical forces that may be applied to a mechanical power transmitting shaft 102, including (but not exclusively) torque, bending, axial load, radial load, and sheer forces. The present description is focusing mainly on torque measurement to keep the description reasonable short.

The described technology of measuring mechanical forces may make it possible to measure, in an accurate and reliable manner, the absolute value of very small magnetic fields over a wide operating temperature range. Traditional solutions of detecting and measuring changes of magnetic fields (like Hall effect sensors) may have difficulties to measure near or at the "zero" point (magnetic field strength of less than +/−0.00001 T=+/−0.01 mT =+/−0.1 G). In relation to the sensing technology according to an exemplary embodiment of the invention, good results can be achieved when using a polarity sensitive, differential mode operating magnetic field sensing system with a signal resolution of better than 1 mG (0.0001 mT=$1*10^{-7}$ T). In many cases, for the use with industrial steels the maximal applicable magnetic field strength for embodiments of this technology to work may be below +/−30 G (+/−0.003 T=+/−3 mT).

Figure 14:
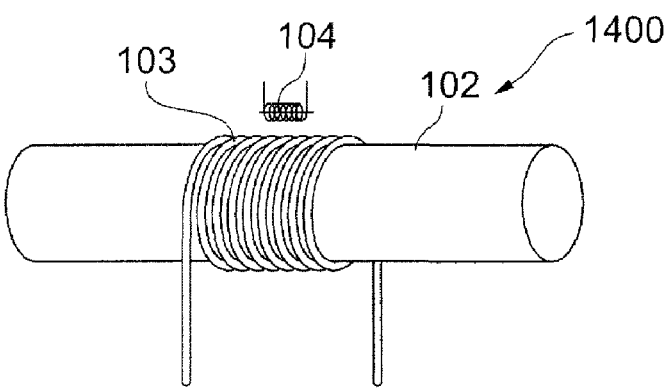
FIG. 14 illustrates a sensor arrangement according to an exemplary embodiment of the invention.

As can be taken from FIG. 14, elements of the sensor arrangements 1400 are the sensing shaft 102 (mechanical power transmitting shaft) like a gearbox input shaft, the magnetic flux generator coil 103, and the magnetic field sensor 104.

An advantage element of the described sensing technology is that it functions properly when the used electrical DC current in the generator coil 103 is within a value "window". When the DC current is too high, the sensing signal may disappear. When the DC current is too low, the sensing signal may be very small and it will be more difficult to separate the sensing signal from the signal offset. The signal offset may be caused by the DC magnetic field generated by the magnetic flux generator coil 103.

It is possible to alternate the DC current of the magnetic flux generator coil 103 as long as the time intervals of each DC driven measurement cycle are long enough for the magnetic flux to fully develop (settle) in the sensing shaft 102. For a shaft with a 20 mm diameter a measurement cycle may be 20 ms or more before the DC current in the generator coil 103 can be reversed.

Alternating the DC driver signal may have the benefit of eliminating a signal offset and/or other disturbing effects, including the cancellation of the earth magnetic field. However there are other solutions available with which the same effect can be achieved.

In the following some benefits will be summarized which may be obtained with the (for instance mechanical force) sensing principle according to an exemplary embodiment of the invention: A high sensing signal bandwidth may be achievable with this sensor design as this system may be capable of "continuously" measuring. No sensor host (shaft 102) processing is required. It is believed that no sensor aging occurs (unwanted reduction or loss of sensor signal) as the magnetic field required for measuring is generated actively. A greatly simplified sensor design may be obtained, as the magnetic field generator coil and the magnetic field sensing device can be assembled and shipped by the sensor manufacturer as one complete unit and assembled around the object by the customers themselves. Furthermore, sensor devices according to embodiments of the invention can be used together with industrial steels that have very little-to-none magnetic remanence. Thus, it is not absolutely necessary that the material(s) of the object can be magnetized (meaning that a magnetic field needs to be stored permanently in side the object). This feature (which may be dispensible with embodiments of the invention) requires very specific industrial steels, for example those with some Nickel content. The technology according to an embodiment of the invention does not rely on storing permanent a magnetic field in the object and therefore allows to relax the demanded object material specification greatly.

In the following, further sensor designs and functions will be described.

Figure 15:
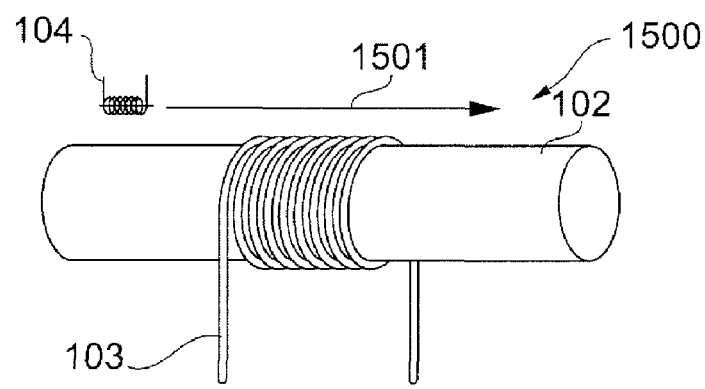
FIG. 15 illustrates a sensor arrangement according to an exemplary embodiment of the invention.

FIG. 15 shows a sensor arrangement 1500 working according to the principle of an "axial" (or "in-line") magnetic flux scan.

The sensor arrangement 1500 comprises a movable detection coil 104 which may be shifted along a motion direction 1501 so that the signal may be detected with a single detection coil 104 along the entire extension of the shaft 102.

Figure 16:
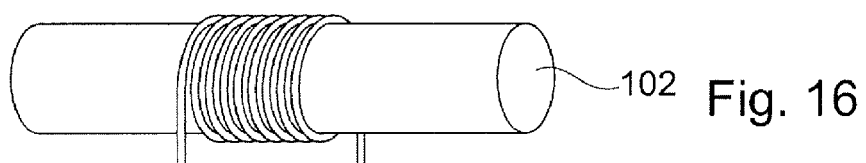
FIG. 16 and FIG. 17 illustrate the sensor arrangement of FIG. 15 and the spatial dependence of a measurement signal detected with this sensor arrangement.
Figure 17:
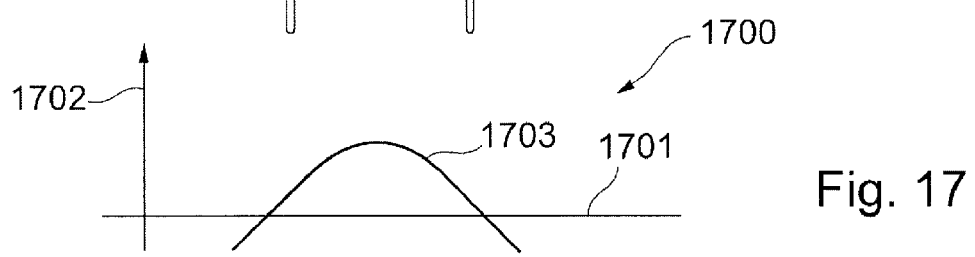

FIG. 16 and FIG. 17 illustrate the sensor arrangement 1500 of FIG. 15 and the spatial dependence of a measurement signal detected with this sensor arrangement.

FIG. 17 shows a diagram 1700 having an abscissa 1701 along which the position (of the movable detection coil 104) along an extension of the shaft 102 is plotted. Along an ordinate 1702 of the diagram 1700, the intensity of a signal detectable by the movable detection coil 104 is plotted. A measurement curve 1703 illustrates the detectable characteristics.

FIG. 17 illustrates the torque signal amplitude when moving one axial oriented magnetic field sensing coil 104 along the side of the sensing shaft 102 (using the axial magnetic flux scanning method). The usable torque signal may have the highest amplitude in the center of the magnetite field generator coil 103.

In the following, referring to FIG. 18, a torque sensor arrangement 1800 for measuring torque applied to an engine shaft 102 according to an exemplary embodiment of the invention will be described.

Figure 18:
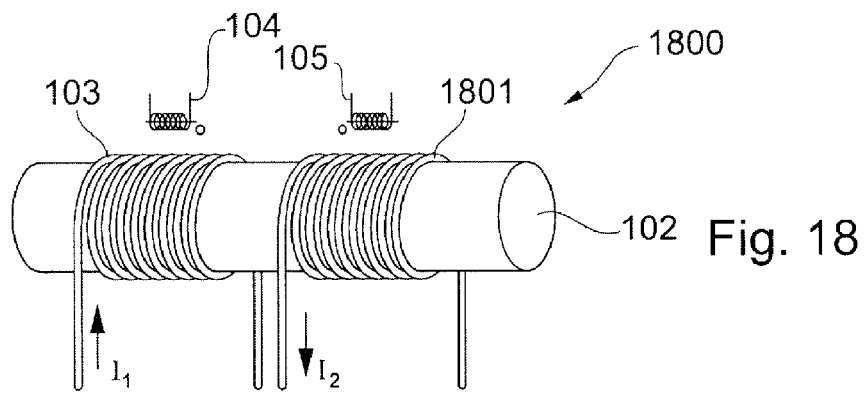
FIG. 18 illustrates a sensor arrangement according to an exemplary embodiment of the invention.

As can be taken from FIG. 18, to eliminate or reduce effects of signal offset and/or unwanted interferences of uniform magnetic stray fields, two DC driven sensors can be placed side-by side. Particularly, an additional magnetic field generator coil 1801 may be provided. The electrical drive currents for each magnetic field generator coil 103, 1801 (I1 and I2) may be identical (assuming that the coil specification for the magnetic field generator coil 103 and for the magnetic field generator coil 1801 are the same and that the sensing shaft 102 diameter is identical at both magnetic field generator coil 103, 1801 location) and may go in opposite direction. The differential output signal from the two magnetic field detector coils 104, 104 (one of each being assigned to a respective of the magnetic field generator coils 103, 1801) may meet high common mode rejection specifications.

Figure 19:
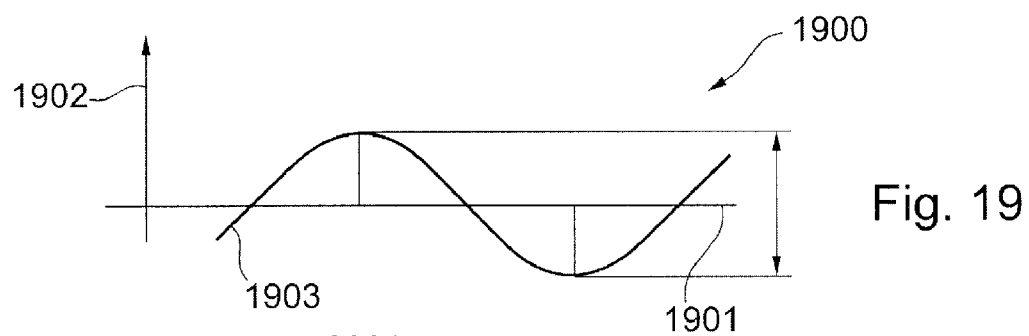
FIG. 19 illustrates the spatial dependence of a measurement signal detected with the sensor arrangement of FIG. 18.

FIG. 19 shows a diagram 1900 having an abscissa 1901 along which the positions of the fixed detection coils 104, 105 along the extension of the shaft 102 are plotted as bold dots. Along an ordinate 1902 of the diagram 1900, the intensity of a signal detectable by the detection coils 104, 105 are plotted. A measurement curve 1903 illustrates the detectable characteristics. With a double arrow, a differential signal with high common mode rejection is indicated.

Figure 20:
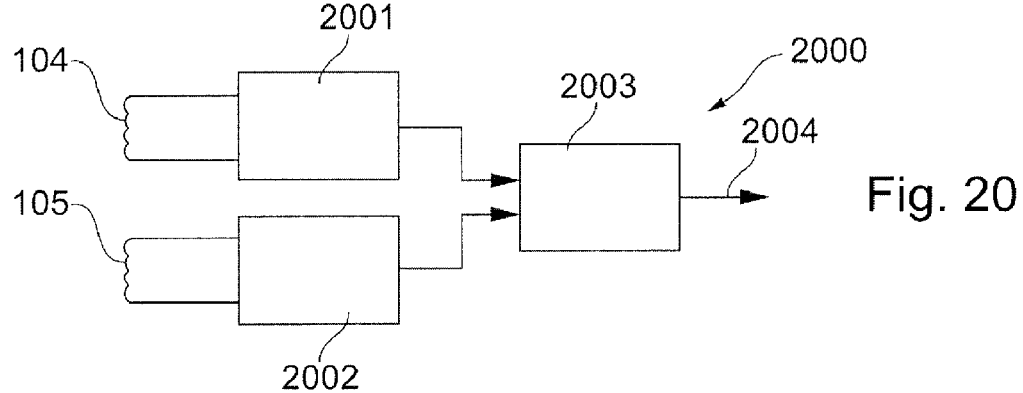
FIG. 20 detects a determination unit for evaluating the signals captured by the sensor arrangement of FIG. 18.

As can be gathered from FIG. 20 illustrating signal conditioning and signal processing electronics 2000, proper results can be achieved when processing the signal of each detector coil 104, 105 separately. That way it may be possible to compensate or suppress effects of non-matching coils. When the detector coils 104, 105 do not match, the output signal from each signal conditioning and signal processing electronics may vary in gain and may also have a different offset. This can be tuned and corrected individually in each of the two signal conditioning and signal processing electronics modules 2001, 2002 before building the differential signal output (in the signal computation electronic module 2003).

Figure 21:
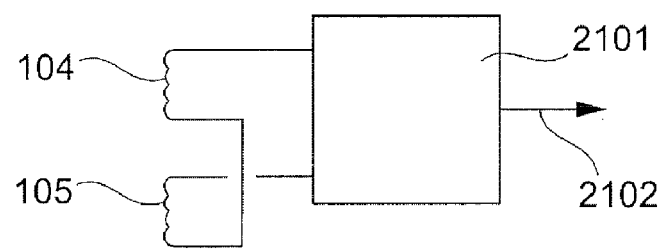
FIG. 21 illustrates schematically a sensor arrangement according to an exemplary embodiment of the invention.

FIG. 21 shows a signal conditioning and signal processing electronics 2100 with a differential mode output signal with proper mode rejection 2101.

When the "matching" specifications of the used detector coils 104, 105 are sufficient, then their signal can be subtracted from each other "direct" before the result will be further processed in the signal conditioning and signal processing electronics 2100 stage. From the cost point of view, this is an advantageous solution.

Figure 22:
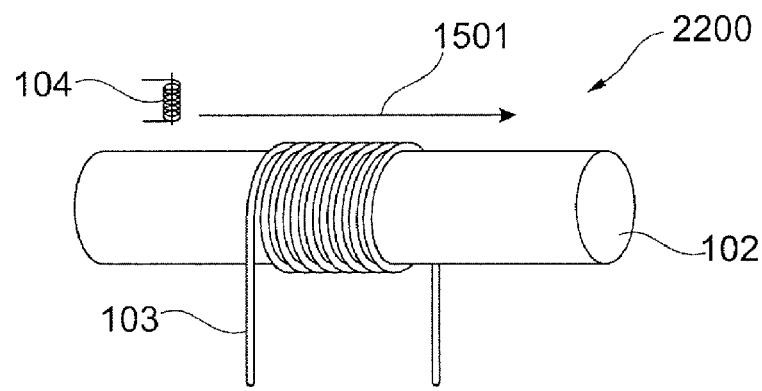
FIG. 22 illustrates a sensor arrangement according to an exemplary embodiment of the invention.

FIG. 22 shows a sensor arrangement 2200 working according to the principle of an "radial" magnetic flux scan.

The sensor arrangement 2200 comprises a movable detection coil 104 which may be shifted along a motion direction 1501 so that the signal may be detected with a single detection coil 104 along the entire extension of the shaft 102.

Figure 23:
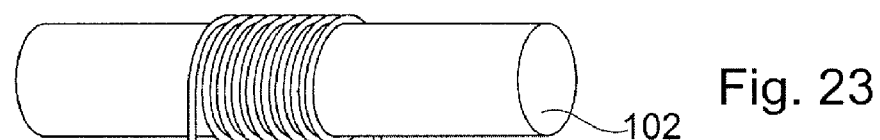
FIG. 23 and FIG. 24 illustrate the sensor arrangement of FIG. 22 and the spatial dependence of a measurement signal detected with this sensor arrangement.
Figure 24:
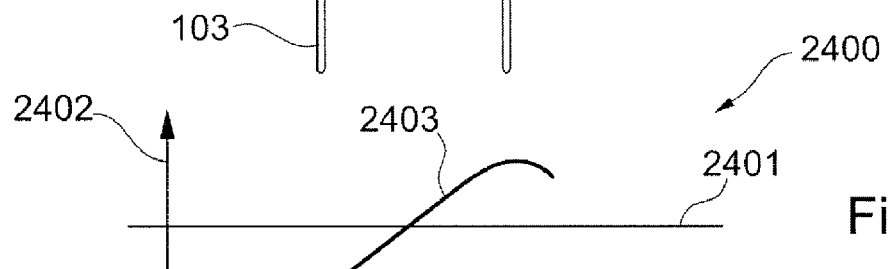

FIG. 23 and FIG. 24 illustrate the sensor arrangement 2200 of FIG. 22 and the spatial dependence of a measurement signal detected with this sensor arrangement.

FIG. 24 shows a diagram 2400 having an abscissa 2401 along which the position (of the movable detection coil 104) along an extension of the shaft 102 is plotted. Along an ordinate 2402 of the diagram 2400, the intensity of a signal detectable by the movable detection coil 104 is plotted. A measurement curve 2403 illustrates the detectable characteristics.

Thus, FIG. 22 to FIG. 24 illustrate the principle of a radial magnetic flux scan.

FIG. 24 illustrates the torque signal amplitude 2403 when taking one radial oriented detection coil 104 and moving it along the side of the sensing shaft 102 (using the radial magnetic flux scanning method). The usable torque signal may have the highest amplitude in the edges and slightly further away from the magnetic field generator coil 103.

Figure 25:
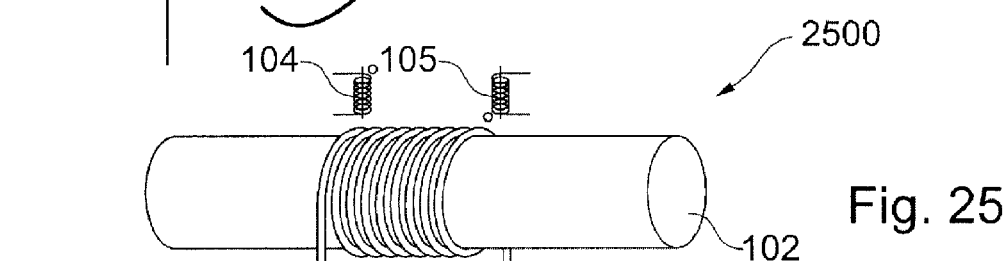
FIG. 25 illustrates a sensor arrangement according to an exemplary embodiment of the invention.

In the following, referring to FIG. 25, a torque sensor arrangement 2500 for measuring torque applied to an engine shaft 102 according to an exemplary embodiment of the invention will be described.

Figure 26:
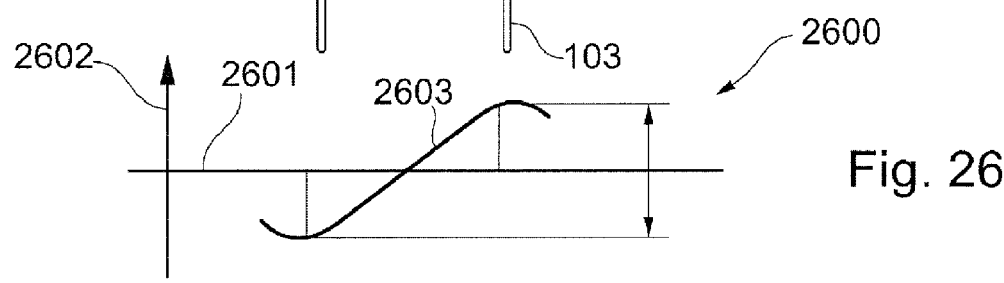
FIG. 26 illustrates the spatial dependence of a measurement signal detected with the sensor arrangement of FIG. 25.

FIG. 26 shows a diagram 2600 having an abscissa 2601 along which the positions of the fixed detection coils 104, 105 along the extension of the shaft 102 are plotted as bold dots. Along an ordinate 2602 of the diagram 2600, the intensity of a signal detectable by the detection coils 104, 105 are plotted. A measurement curve 2603 illustrates the detectable characteristics. With a double arrow, a total DC driven sensor signal is indicated.

When placing two radial oriented detection coils 104, 105 at the top of the sensing shaft 102, one detection coil 104, 105 at each end of the magnetic field generator coil 103 and then subtract the signals from each other, the resulting output signal will meet proper common mode rejection standards.

Meaning that, this DC driven sensor design will reject the unwanted effects caused by uniform magnetic stray fields, like the earth magnetic field.

Figure 27:
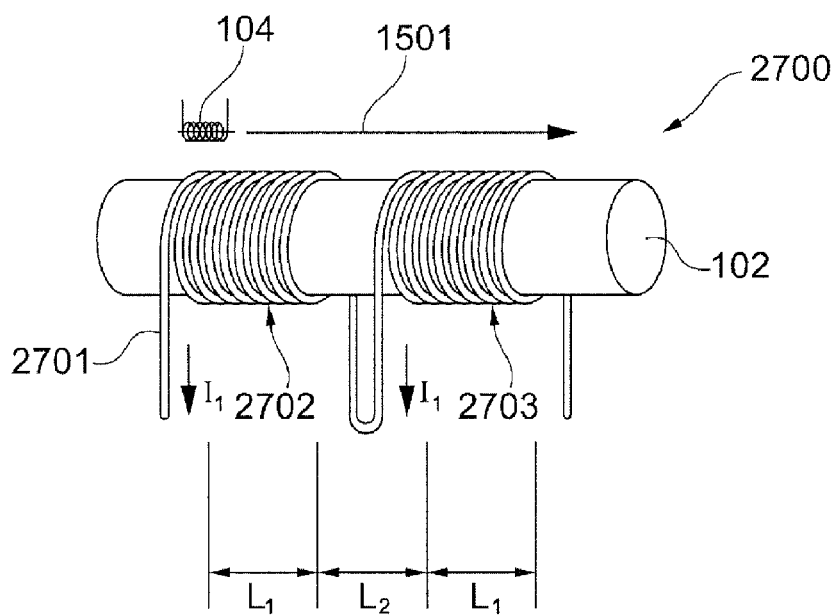
FIG. 27 illustrates a sensor arrangement according to an exemplary embodiment of the invention.

In the following, referring to FIG. 27, a torque sensor arrangement 2700 for measuring torque applied to an engine shaft 102 according to an exemplary embodiment of the invention will be described.

In this embodiment, a generator coil 2701 is divided into a first portion 2702 extending along a first length $L_1$ of the shaft 102 and into a second portion 2703 extending along a second length $L_1$ (however the second length may differ from the first length) of the shaft 102, wherein the first portion 2702 is spaced from the second portion 2703 by a distance $L_2$.

To stretch the axial signal uniformity section, two magnetic field generator coils (or, as in FIG. 27, one magnetic field generator coil 2701 having two portions 2702, 2703) have to be placed side-by-side with a gap or spacing between them ($L_2$). Assuming that both of the magnetic field generator coils are identical and that the electrical current I1 is the same, then the required spacing $L_2$ is a function of the magnetic field generator coil $L_1$.

The larger the axial signal uniformity section is, the more the magnetic field generator coil can move axially in relation to the magnetic field detection coil without interfering with the sensor signal quality. This may simplify the sensor assembly as the sensor design can cope with larger tolerances.

Figure 28:
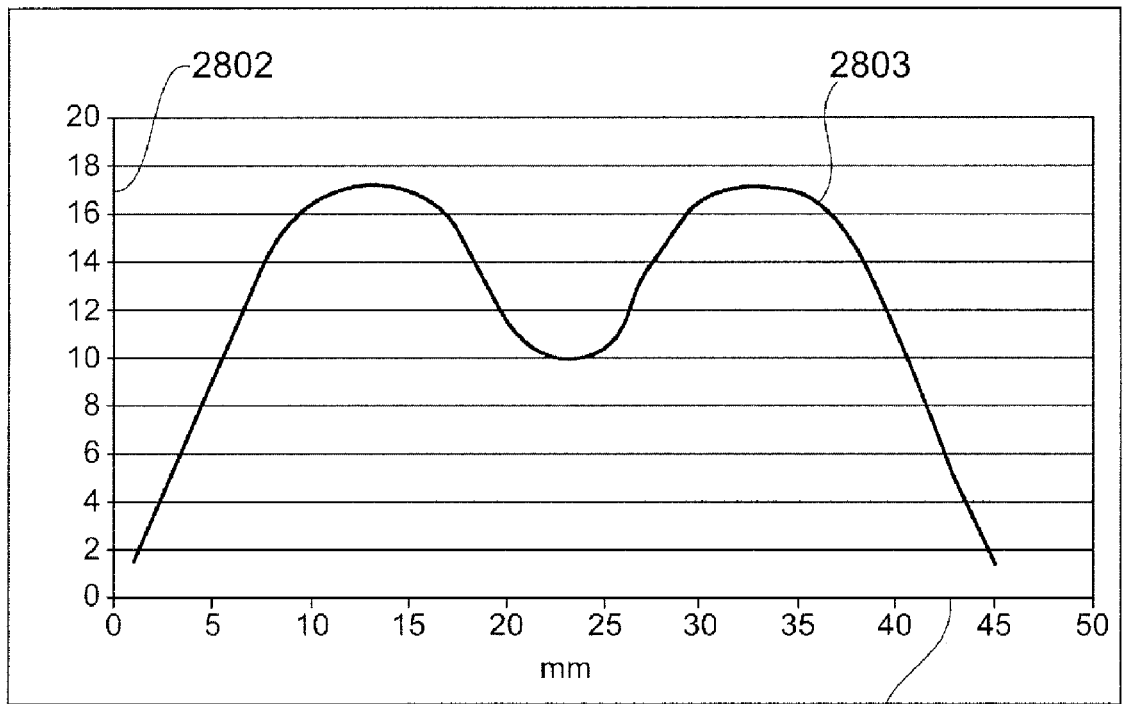
FIG. 28 illustrates the spatial dependence of a measurement signal detected with the sensor arrangement of FIG. 27.

FIG. 28 shows a diagram 2800 having an abscissa 2801 along which the position of the detection coil 104 along the extension of the shaft 102 is plotted (axial position in mm). Along an ordinate 2802 of the diagram 2800, the intensity of a signal (sensor output) detectable by the detection coil 104 of the device 2700 is plotted. A measurement curve 2803 illustrates the detectable characteristics.

In FIG. 28, the spacing $L_2$ between the magnetic field generator coil parts 2702, 2703 is too large which is why the signal gain is dropping in the middle section (axial position of the magnetic field detection coil 104; 17 mm to 28 mm).

Figure 29:
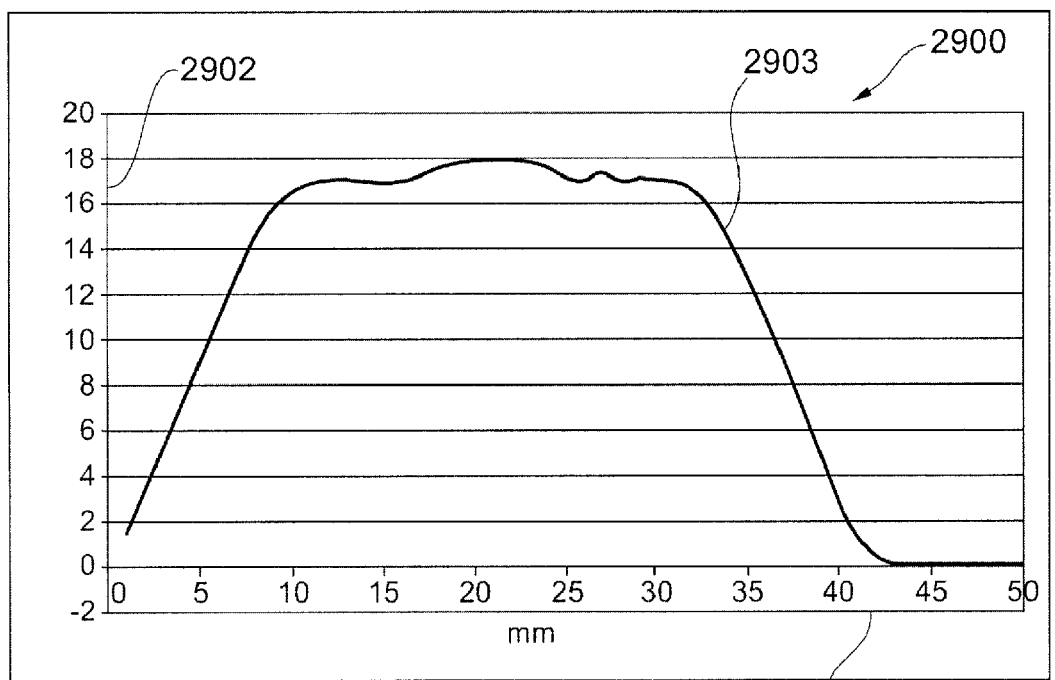
FIG. 29 illustrates the spatial dependence of a measurement signal detected with a sensor arrangement similar to that of FIG. 27 with a reduced distance between the magnetic field generator coils.

FIG. 29 shows a diagram 2900 having an abscissa 2901 along which the position of the detection coil 104 along the extension of the shaft 102 is plotted (axial position in mm). Along an ordinate 2902 of the diagram 2900, the intensity of a signal (sensor output) detectable by the detection coil 104 of the device 2700 with a modified distance $L_2$ is plotted. A measurement curve 2903 illustrates the detectable characteristics.

As can be taken from FIG. 29, by reducing the spacing $L_2$ between the two magnetic field generator coil portions 2702, 2703 the axial signal uniformity section is almost constant over the entire section (10 mm to 32 mm in this specific example). The here shown example has a signal amplitude ripple of around +/−4%.

Figure 30:
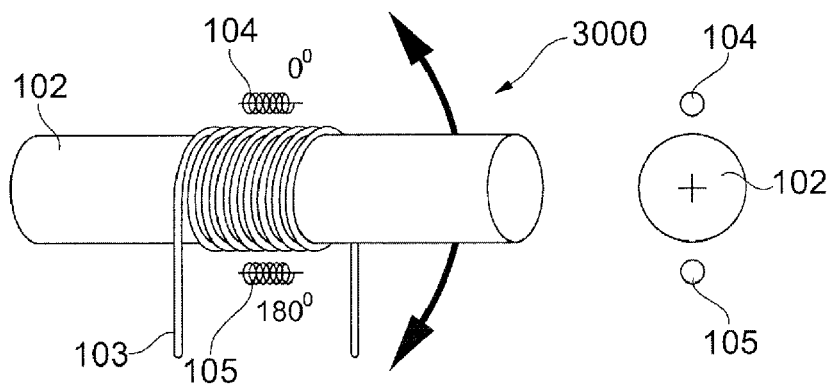
FIG. 30 illustrates a sensor arrangement according to an exemplary embodiment of the invention.

In the following, referring to FIG. 30, a sensor arrangement 3000 for measuring bending forces of a shaft 102 in one axis according to an exemplary embodiment of the invention will be described.

To be able detecting and measuring bending forces in one axis (like in the X-Axis), at least two magnetic field sensor (MFS) devices 104, 105 are implemented. These two magnetic field sensor devices 104, 105 are placed opposite to each other in the plane (axis) where the bending forces are to be measured (in this specific example: at the position "0°" and "180°", in relation to the object 102). The "bending" signal is the difference between the measurement signals: (MFS-0°-MFS-180°)*Constant=Bending Forces, wherein a correction factor may be advantageous ("constant") to convert the result directly in Newton bending force.

Figure 31:
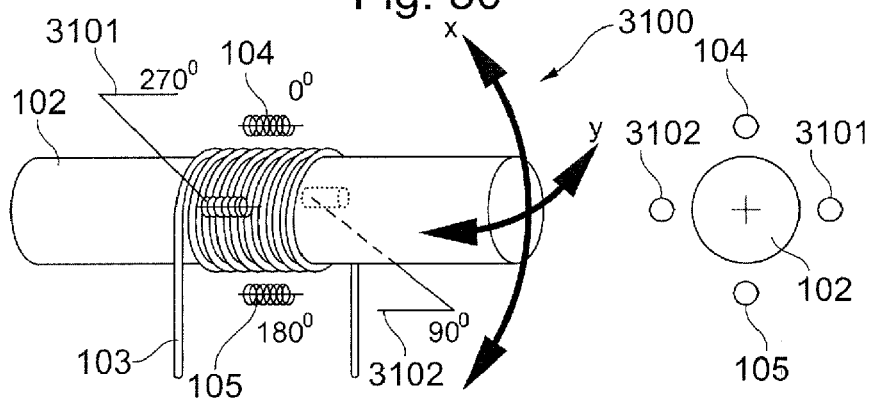
FIG. 31 illustrates a sensor arrangement according to an exemplary embodiment of the invention.

In the following, referring to FIG. 31, a sensor arrangement 3100 for measuring bending forces of a shaft 102 in two axis X and Y according to an exemplary embodiment of the invention will be described.

Here, four magnetic field sensor (MFS) devices 104, 105, 3101, 3102 are implemented.

To detect and measure the bending forces in the second axis, Y, two further MFS devices 3101, 3102 are provided that are placed opposite to each other in the plane of the Y-bending forces: MFS-90° and MFS-270°.

Figure 32:
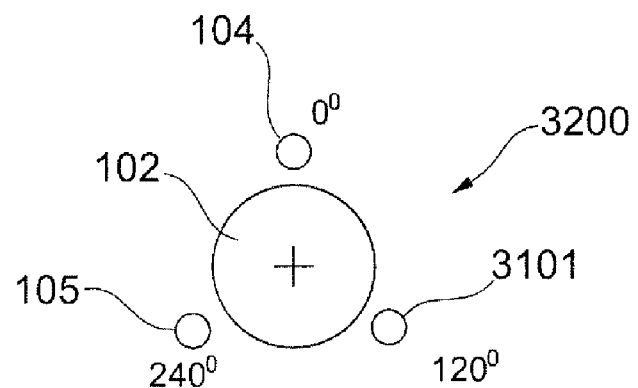
FIG. 32 illustrates a sensor arrangement according to an exemplary embodiment of the invention.

In the following, referring to FIG. 32, a sensor arrangement 3200 for measuring bending forces of a shaft 102 in two axis X and Y according to another exemplary embodiment of the invention will be described.

Instead of using four MFS devices to detect and measure the bending forces in the X and in the Y axis, only three MFS devices 104, 105, 3101 can be used when placed with an 120° angle between them: MFS-0°, MFS-120°, and MFS-240°.

As will be described in the following, the technology according to an exemplary embodiment of the invention may also be used for material analysis (quality check).

When rotating the shaft (ferromagnetic properties may be advantageous in this case) inside the magnetic field generator coil and monitoring the output signal of one magnetic field sensor device, the process output signal of the magnetic field sensor device will change in amplitude in relation to changes of the shaft hardening depth. This solution may allow to check if the hardening depth of a hardened shaft stays within desired dimensions.

As will be described in the following, the technology according to an exemplary embodiment of the invention may also be used for detecting surface cracks in a ferromagnetic shaft.

When rotating the shaft inside the activated magnetic field generator coil, the output signal of one magnetic field sensor device is capable to detect cracks in the shaft surface. The processed output signal will change in amplitude sharply when a crack in the shaft surface lies directly beneath the magnetic field sensor coil. The physical dimensions of the metal cracks that can be detected by this method may depend on the following specifications:

Physical dimension of the magnetic field sensor device (the smaller the coil the smaller the cracks that can be detected in the shaft surface)

Spacing between magnetic field sensor device and shaft (the smaller the air gap the more detailed and more accurate is the signal)

As will be described in the following, the technology according to an exemplary embodiment of the invention may also be used for surface roughness or even to count teeth.

The output signal of one magnetic field sensor device may show large amplitude changes when the shaft diameter, or the surface structure of the shaft will change. This allows to use this technology for material quality checks (attention: without further magnetic field sensor coil arrangements or signal computation/filtering it may be difficult to differentiate between signal changes caused by hardening depth modulations or shaft surface feature changes), and for measuring the rotational speed of the shaft (Speed/RPM sensor).

Figure 33:
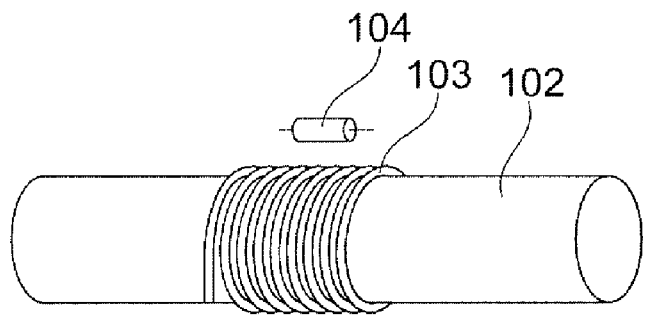
FIG. 33 illustrates a sensor arrangement according to an exemplary embodiment of the invention.
Figure 34:
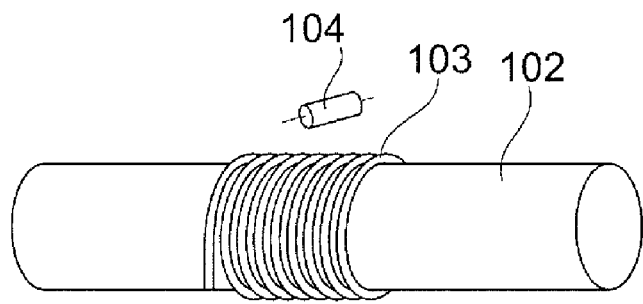
FIG. 34 illustrates a sensor arrangement according to an exemplary embodiment of the invention.

FIG. 33 illustrates a sensor arrangement according to an exemplary embodiment of the invention, which is essentially identical to the sensor arrangement of FIG. 14. FIG. 34 illustrates another sensor arrangement according to an exemplary embodiment of the invention which differs from the sensor arrangement of FIG. 33 with regard to the orientation of the coil axis of the detector coil 104 relative to the axis of the excitation coil 103. In FIG. 33, both axis are essentially parallel to one another. In FIG. 34, the two axis are essentially perpendicular to one another. Both configurations yield a functioning sensor.

Next, some further aspects regarding an active electrical powered torque sensing system will be explained.

An exemplary active powered torque sensing module (ATS) is based on the collected understanding about how magnetic flux lines travel through a Ferro-magnetic object (drive shaft) that is under mechanical stresses (like when torque is applied to the drive shaft). A main difference of the ATS sensing principle in relation to previous magnetostriction torque sensing technologies is that the magnetic source field no longer needs to be permanently stored into the drive shaft. The required magnetic source field is actively generated by an electro magnetic source that is placed near the drive shaft while measuring the applied torque forces.

Consequently a number of performance and feature differ when comparing the AST Torque Sensor with other technologies:

- The requirements on the Ferro-magnetic shaft material are more relaxed as there is no longer the need for a magnetic retentivity in the shaft material.
- There is no need for magnetic "processing" of the drive shaft.
- There is no need of "matching" magnetically encoded drive shafts with the electronic sensing module (which may be called Secondary Sensor) at sensor "high-end" applications.
- The magnetic encoding of the drive shaft can no longer be destroyed as it is "actively" generated "life" during the actual torque measurements.
- This sensing technology can detect more accurately the presence of interfering magnetic stray fields (when operating in the AC mode) and therefore compensate unwanted signal offsets,
- The electrical current consumptions of the entire sensor system will be higher as the required magnetic source field has to be actively generated (estimated in the region and below of 100 mA at +5 Volt supply).
- The AST Torque Sensor module can be manufactured as one stand alone sensor device ("one" unit only). This simplifies the logistic and is easier to manage in product maintenance and repair situations (example: when replacing a drive shaft in a passenger car).

In the following, the sensor performance of the described technology will be presented.

A main objective when working on the ATS sensing technology is to remove the need of magnetically processing the drive shaft (which may be called the Primary Sensor).

This may greatly simplify the sensor module manufacturing process and also has an impact on the required drive shaft (Primary Sensor) material: cost reduction. A "complete" torque ATS torque sensor module can be fully produced, tested, and branded and at a much later time mated with the drive shaft (Primary Sensor) where the actual torque measurement has to take place.

In comparison with conventional sensing technologies the same torque signal sensitivity is achievable and the same high signal bandwidth. As the sensitivity to interfering magnetic stray fields may be improved (in comparison to the conventional sensing technology) the total sensor current consumption may be always higher.

With regard to the sensor design, a key design issue of the ATS sensing technology is the very specific magnetic field strength that needs to be generated for a specific drive shaft (Primary Sensor). The magnetostriction sensing principle is very sensitive about the amount of magnet flux that has to pass through the shaft during measurement.

In most applications, where the torque forces have to be measured from a rotating drive shaft, it will be easiest to use an electric powered magnetic field generating coil (generator field) that is placed (wound) around the targeted sensing region. It is tolerable to this sensing principle that there is a gap (example: air gap) between the drive shaft surface and the magnetic field generating coil.

It is also conceivable that the magnetic field generating coil is not fully wound around the drive shaft but place on one or more sides near the sensing region. Such a potential mechanic design solution has benefits when the drive shaft has non-uniform or very large shaft ends (a normal "round shaped" coil could not easily pushed over the ends of such a shaft design).

Equally important is the location and orientation (in relation to the generator field) where the torque sensing signals can be detected and measured. At present it is assumed that the improved magnetic "fluxgate" sensing principle provides the optimal sensitivity and features to detect the magnetic field changes that are caused by the applied torque forces to the drive shaft.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

LIST OF REFERENCE SIGNS 100 torque sensor arrangement
101 torque sensor device
102 engine shaft
103 generator coil
104 first detector coil
105 second detector coil
106 hinge joint
107 control electronics
200 sensor device
201 third detector coil
400 magnetization vector
500 torque-modified magnetization vector
700 diagram
701 abscissa
702 ordinate
703 first direct current signal
704 second direct current signal
800 diagram
801 abscissa
802 ordinate
803 first direct current signal
804 second direct current signal
900 sensor arrangement
901 longitudinal magnetization
1300 sensor arrangement
1301 tube
1302 support member
1400 torque sensor arrangement
1500 sensor arrangement
1501 moving direction
1700 diagram
1701 abscissa
1702 ordinate
1703 measurement curve
1800 sensor arrangement 1801 additional generator coil
1900 diagram
1901 abscissa
1902 ordinate
1903 measurement curve
2000 sensor conditioning and sensor processing electronics
2001 first sensor conditioning and sensor processing channel
2002 second sensor conditioning and sensor processing channel
2003 signal computation unit
2004 differential mode output signal with common mode rejection
2100 sensor conditioning and sensor processing electronics
2101 differential mode output signal with common mode rejection
2200 sensor arrangement
2400 diagram
2401 abscissa
2402 ordinate
2403 measurement curve
2500 sensor arrangement
2600 diagram
2601 abscissa
2602 ordinate
2603 measurement curve
2700 torque sensor arrangement
2701 generator coil
2702 first portion
2703 second portion
2800 diagram
2801 abscissa
2802 ordinate
2803 measurement curve
2900 diagram
2901 abscissa
2902 ordinate
2903 measurement curve
3000 sensor arrangement
3100 sensor arrangement
3101 MFS device
3102 MFS device
3200 sensor arrangement

The invention claimed is:

1. A sensor device for measuring a property of an object, comprising:
a magnetic field generator generating a magnetic field in at least a part of the object; and
at least one magnetic field detector detecting at least one detection signal in response to the magnetic field generated in at least a part of the object, the at least one detection signal being indicative of the property of the object,
wherein one of a direct current and a direct voltage is applicable to the magnetic field generator to generate the magnetic field in at least a part of the object,
wherein one of the direct current and the direct voltage has a first value applied to the magnetic field generator for a first time interval and a second value applied for a second time interval to the magnetic field generator,
wherein the first value and the second value have different amplitudes, and
wherein the first value and the second value have opposite signs.

2. The sensor device of claim 1, wherein one of the direct current and the direct voltage is adapted in such a manner that, after switching off one of the direct current and the direct voltage, the object is substantially free of a remaining magnetization.

3. The sensor device of claim 1, wherein one of the direct current and the direct voltage is applicable to the magnetic field generator to generate the magnetic field in at least a part of the object with an amplitude of less or equal 30 Gauss.

4. The sensor device of claim 1, wherein the direct current applicable to the magnetic field generator has an amplitude of less or equal 500 mA.

5. The sensor device claim 1, wherein one of the direct current and the direct voltage has a constant value over at least an interval of time.

6. The sensor device of claim 1, further comprising:
a determination unit determining at least one parameter indicative of the property of the object based on the at least one detection signal.

7. The sensor device of claim 1, wherein the magnetic field generator is a magnetic field generator coil.

8. The sensor device of claim 1, wherein the magnetic field generator has a reception for receiving the object.

9. The sensor device of claim 8, wherein the reception is a central opening provided in the magnetic field generator.

10. The sensor device of claim 1, wherein at least one of the first time interval and the second time interval is between 1 ms and 500 ms.

11. The sensor device of claim 1, wherein at least one of the first time interval and the second time interval is between 20 ms and 100 ms.

12. The sensor device of claim 1, wherein the at least one magnetic field detector in arranged on the magnetic field generator.

13. The sensor device of claim 1, wherein the at least one magnetic field detector in integrated in the magnetic field generator.

14. The sensor device of claim 1, further comprising:
two magnetic field detectors arranged symmetrically on the magnetic field generator.

15. The sensor device of claim 1, further comprising:
a plurality of magnetic field detectors.

16. The sensor device of claim 1, wherein the at least one magnetic field detector includes at least one of the group consisting of: a coil having a coil axis oriented substantially parallel to an extension of the object; a coil having a coil axis oriented essentially perpendicular to an extension of the object; a Hall-effect probe; a Giant Magnetic Resonance magnetic field sensor; and a Magnetic Resonance magnetic field sensor.

17. The sensor device of claim 1, wherein the property of the object is selected from the group consisting of an angular position of the object when rotating, a position of the object when reciprocating, a torque applied to the object, a force applied to the object, a shear force applied to the object, a velocity of the object, an acceleration of the object, and a power of the object.

18. The sensor device of claim 1, wherein the property of the object is an external influence exerted on the object.

19. The sensor device of claim 1, wherein the sensor is a portable sensor device.

20. The sensor device of claim 1, further comprising:
a plurality of magnetic field generators.

21. The sensor device of claim 20, wherein the plurality of magnetic field generators are arranged along an extension of the object.

22. The sensor device of claim 1, wherein the at least one magnetic field detector is movable along an extension of the object.

23. The sensor device of claim 1, wherein the magnetic field generator generates the magnetic field one of temporarily and permanently in at least a part of the object.

24. The sensor device of claim 1, wherein the object is one of a movable object and a static object.

25. The sensor device of claim 1, wherein the object is made of one of a magnetic material and a magnetizable material.

26. An arrangement, comprising:
    an object; and
    a sensor device including (a) a magnetic field generator generating a magnetic field in at least a part of the object; and at least one magnetic field detector detecting at least one detection signal in response to the magnetic field generated in at least a part of the object, the at least one detection signal being indicative of the property of the object,
    wherein one of a direct current and a direct voltage is applicable to the magnetic field generator to generate the magnetic field in at least a part of the object,
    wherein one of the direct current and the direct voltage has a first value applied to the magnetic field generator for a first time interval and a second value applied for a second time interval to the magnetic field generator,
    wherein the first value and the second value have different amplitudes, and
    wherein the first value and the second value have opposite signs.

27. The arrangement of claim 26, wherein the object is at least one of the group consisting of a shaft, a tube, a disk, a ring, and a none-round object.

28. The arrangement of claim 26, wherein the object is one of the group consisting of an engine shaft, a reciprocable work cylinder, and a push-pull-rod.

29. A method for measuring a property of an object, comprising
    generating a magnetic field in at least a part of the object by applying one of a direct current and a direct voltage to a magnetic field generator; and
    detecting at least one detection signal in response to the magnetic field generated in at least a part of the object, the at least one detection signal being indicative of the property of the object,
    wherein one of the direct current and the direct voltage has a first value applied to the magnetic field generator for a first time interval and a second value applied for a second time interval to the magnetic field generator,
    wherein the first value and the second value have different amplitudes, and
    wherein the first value and the second value have opposite signs.

* * * * *